Figure 1:
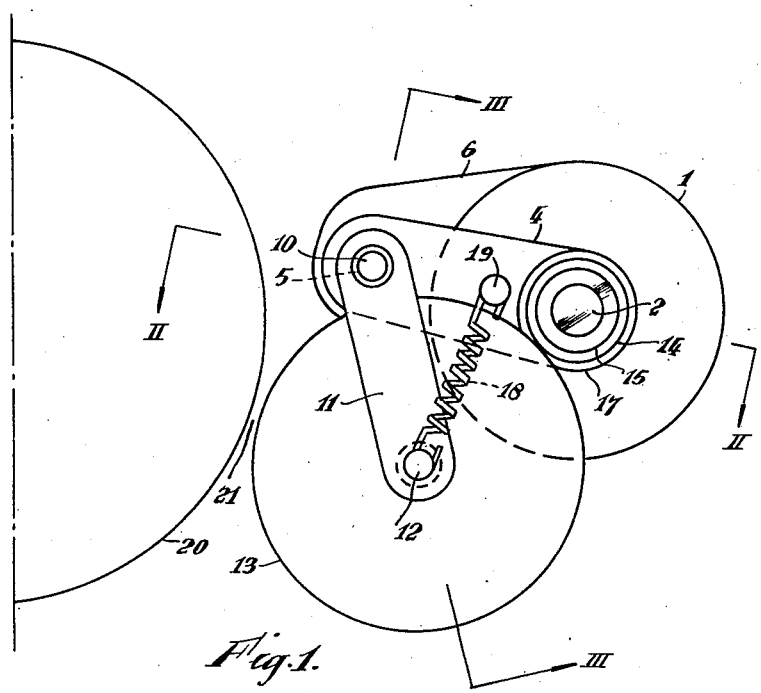

Feb. 18, 1958  W. W. H. BARRETT  2,823,546
COUPLING FOR THE TRANSMISSION OF ROTARY MOTION
Filed June 26, 1953  3 Sheets-Sheet 1

Inventor
Walter William Henry Barrett
by Albert Jacobs
Attorney

Feb. 18, 1958 W. W. H. BARRETT 2,823,546
COUPLING FOR THE TRANSMISSION OF ROTARY MOTION
Filed June 26, 1953 3 Sheets-Sheet 3
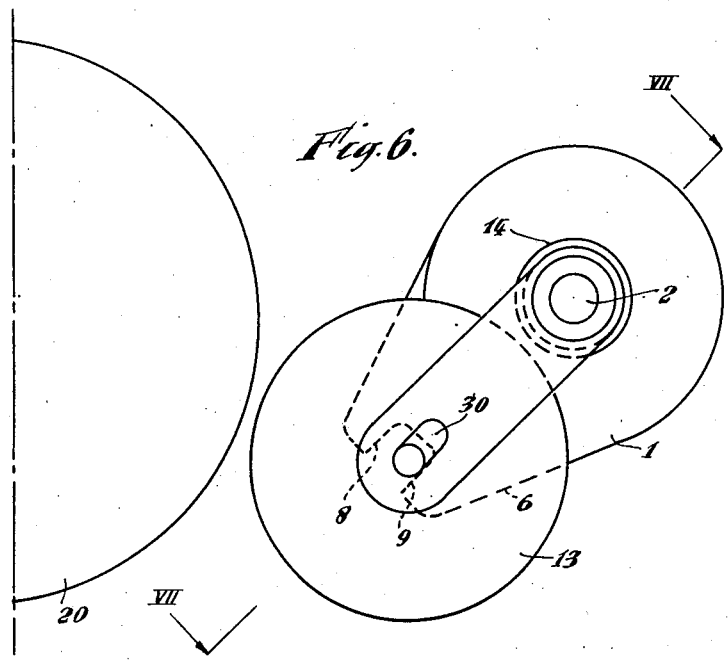
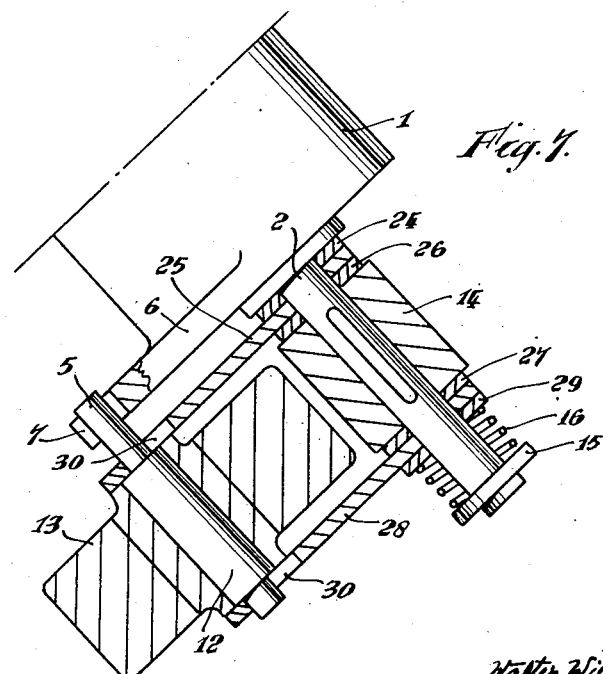

United States Patent Office 2,823,546
Patented Feb. 18, 1958

2,823,546

COUPLING FOR THE TRANSMISSION OF ROTARY MOTION

Walter William Henry Barrett, Bath, Somerset, England

Application June 26, 1953, Serial No. 364,422

Claims priority, application Great Britain June 27, 1952

7 Claims. (Cl. 74—8)

This invention relates to a coupling for the transmission of rotary motion.

It is known to establish a driving connection between two wheels, such as toothed gear or friction wheels, by placing an idle wheel between them and thereby make up a continuous train of wheels.

The object of the invention is to provide automatic means for the manipulation of the idle wheel.

Although the invention may have a variety of applications, it is particularly useful as a coupling for a starter motor for internal combustion engines.

According to the present invention a coupling for the transmission of rotary motion comprising an idle wheel adapted to be engaged in driving connection between a driving and a driven wheel or withdrawn from such connection, is characterised in that the idle wheel is supported by a lever arrangement which is mounted for pivotal motion about the axis of the driving wheel, and by the provision of automatic means acting on the lever arrangement for moving the idle wheel into the engaged position in response to the movement of the driving wheel when the latter is rotated and moving the idle wheel into the withdrawn position when the driving wheel is stopped.

The automatic means for moving the idle wheel into the engaged position may comprise clutch means whose driving and driven elements are associated with the driving wheel and the lever arrangement respectively. The said clutch means may be friction clutch means adapted to slip when the engaged position of the idle wheel is reached and may comprise a clutch between the lever arrangement and the driving wheel or between the lever arrangement and the idle wheel provided in the latter case that the idle wheel is in permanent contact with the driving wheel.

In cases where the driving wheel and the idle wheel are friction wheels the automatic means for moving the idle wheel into the engaged position may be constituted by the rolling friction between the driving and the idle wheel, provided the idle wheel is in permanent driving contact with the driving wheel.

Also in cases where the driving and the idle wheel are friction wheels, the idle wheel may be mounted in a manner permitting it to make a certain amount of floating motion transversely of its axis and relative to the lever arrangement, the automatic means for moving the idle wheel into the engaged position in this case comprising clutch means between the lever arrangement and the driving wheel.

Figure 2:
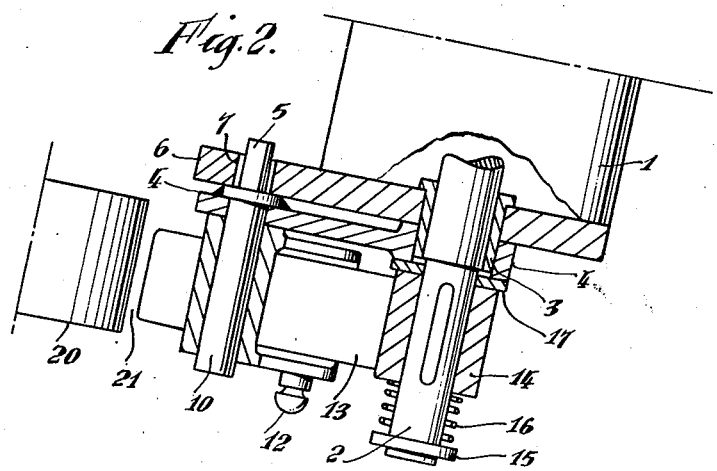
Figure 3:
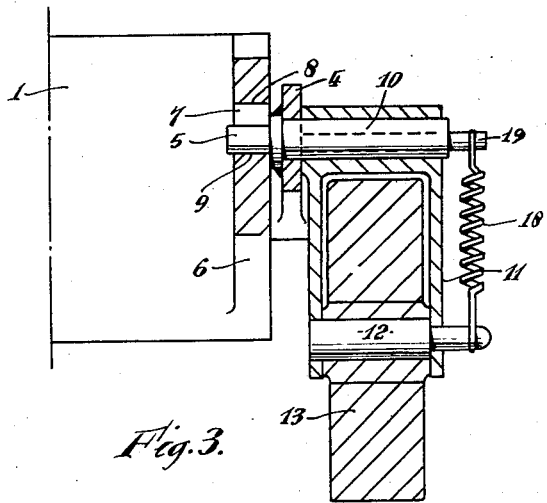
Figure 4:
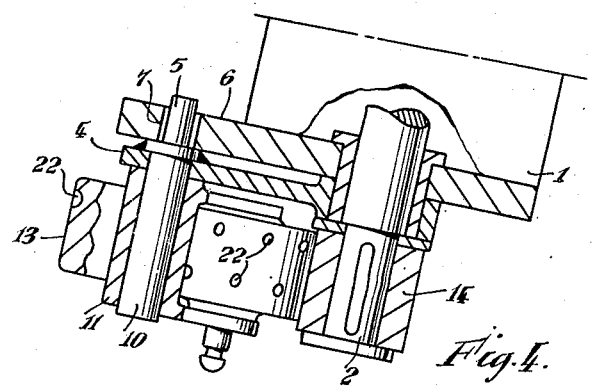

Constructional forms of the present invention, as applied to starter couplings for internal combustion engines, will now be described with reference to the accompanying drawings wherein:

Fig. 1 is an end elevation of a first form coupling according to this invention, Fig. 2 is a section on the line II—II in Fig. 1, Fig. 3 is a section on the line III—III in Fig. 1, Fig. 4 is a section similar to Fig. 2 and illustrates a second form of coupling according to this invention as a variant of the coupling shown in Figs. 1 to 3, Fig. 5 is a section similar to Fig. 3 and illustrates a third form of coupling according to this invention as a further variant of the coupling shown in Figs. 1 to 3, Fig. 6 is an elevation of a fourth form of coupling according to this invention, Fig. 7 is a section on the line VII—VII in Fig. 6.

Referring to Figs. 1 to 3, there is provided a starter motor 1 having an output shaft 2 journalled in a protruding bush 3, a lever 4 pivotally situated on the bush 3, a pin 5 secured to the lever 4, a bracket 6 secured to the motor 1, a slot 7 freely embracing the pin 5 and having upper and lower ends 8 and 9, respectively, a pin 10 secured to the lever 4, a fork 11 pivotally located on the pin 10, a bearing pin 12 secured between the open ends of the fork 11, a rubber roller 13 rotatably located on the pin 12, a steel roller 14 keyed to the shaft 2 in a manner permitting free axial sliding thereon, a collar 15 secured on the end of the shaft 2, a helical spring 16 in a state of compression between the collar 15 and the nearest end face of the roller 14, a fibre disc 17 between the other end face of the roller 14 and the lever 4, a spring 18 in a state of tension between the bearing pin 12 and a pin 19 located on the lever between the ends thereof, and an engine flywheel 20. The rollers 13 and 14 and the flywheel 20 constitute respectively the driving, idle and driven wheels of the coupling and all their axes are parallel. The spring 16 and the frictionally cooperating faces of the roller 14 and the lever 4 constitute friction clutch means between the driving wheel and the lever arrangement. The rollers 13 and 14 are in constant circumferential engagement by virtue of the spring 18. The distance between the circumferences of the roller 14 and the wheel 20 is smaller than the diameter of the roller 13.

In operation, when the starter motor stands still the lever 4 and thus the roller 13 fall gravitationally into a lowered position limited by the end 9 of the slot 7. In this position there is a gap 21 between the roller 13 and the wheel 20, and the roller 13 is in withdrawn position. When the motor 1 is started, turning in a clockwise direction (Fig. 1) the friction between the roller 14 and the lever 4 on account of the pressure of the spring 16 causes the lever to pivot in a clockwise direction and bring the roller 13 into contact with the wheel 20. In this position, being the engaged position, of the roller 13 the rotation of the roller 14 is transmitted to the wheel 20. There is a tendency for the roller 13 to roll on the wheel 20 and urge itself into firm engagement between the converging diameters of the roller 14 and the wheel 20; thereby a firm driving contact is ensured. The engaged position of the roller 13 is limited by the upper end 8 of the slot 7. As soon as the engine starts and the fly wheel 20 begins to have a greater circumferential speed than the roller 13 the latter is urged out of its engaged position; there is no tendency for the fly wheel to retain contact with the roller 13 under such circumstances. When the engine starts the motor 1 is of course stopped and the roller 13 falls back into its withdrawn position.

Referring to Fig. 4, the rollers 13 and 14 are constructed in such a way that there exists a considerable amount of rolling friction between them. For example the roller 13 may be made of a soft rubber and the roller 14 may be knurled on its circumference. Preferably, the roller 13 is made of soft rubber and provided on its circumference with a plurality of shallow, say hemispherical, holes 22 which cause the rubber roller to have a tendency to adhere to the circumference of the roller 14 substantially in the manner of suction cups; in this case the roller 14 may have a smooth circumference. Such rolling friction applies an upward force to the pin 12 and therefore a turning couple to the lever 4 and tends to raise the roller 13 and urge it into the engaged position when the motor 1 is started. In cases where the weight of the lever arrangement and of the roller 13 is relatively small, the said rolling friction is sufficient for moving the roller 13 into the engaged position and the clutch means between the roller 14 and the lever 4 are dispensed with as illustrated.

Figure 5:
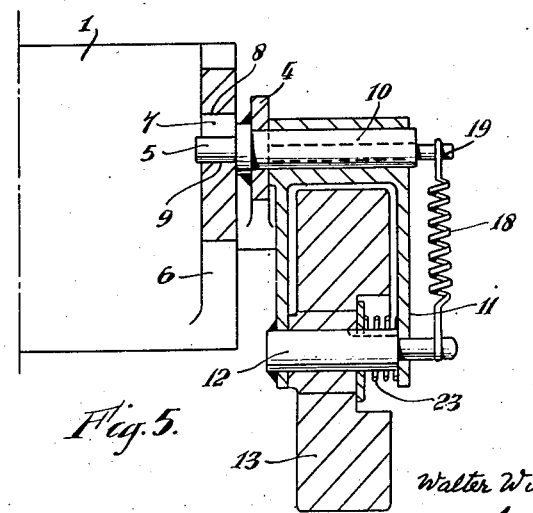

Referring to Fig. 5, the clutch means between the roller 14 and lever 4 are dispensed with in the manner shown in Fig. 4, and instead friction clutch means are introduced between the idle wheel and the lever arrangement in the form of a spring 23 being in a state of compression between one limb of the fork 11 and a washer bearing on the adjacent end face of the roller 13. The frictional resistance between the roller 13 and the lever 4 causes an upward force on the lever arrangement whereby the roller 13 is urged into the engaged position when the motor 1 is started.

Referring to Figs. 6 and 7, this form of the invention embodies clutch means between the driving wheel and the lever arrangement and shows a floatingly mounted idle wheel. There are assembled on the shaft 2 of the starter motor 1 the following elements: a fibre washer 24, an arm 25, a fibre washer 26, the roller 14, a fibre washer 27, an arm 28, a fibre washer 29, the spring 16 and the collar 15. The arms 25 and 28 are pivotally mounted on the shaft 2 and extend in spaced apart parallel relationship to form a fork for the reception of the roller 13. The bearing pin 12 of the roller 13 is mounted in slots 30, 30 which extend longitudinally in the arms 25 and 28. The pin 5 is formed as an extension of the bearing pin 12 and extends into the slot 7 in the bracket 6. In operation, when the motor 1 stands still, the roller 13 rests in the lowest position permitted by the slots 30. In this position the roller 13 may be in contact with the roller 14, but not necessarily. When the motor 1 is started the rotation of the shaft 2 is transmitted to the arms 25 and 28 by virtue of the friction between the end faces of the roller 14, the fibre washers 24, 26, 27 and 29 and the corresponding faces of the arms 25 and 28. Thereby the arms 25 and 28 are raised and bring the roller 13 into the engaged position. By virtue of the slots 30 the roller 13 can find its own centre position whereby any wear thereof is automatically compensated and the radial contact pressures of the roller 13 with the roller 14 and the wheel 20 are always equal.

It will be appreciated that it may not always be convenient to rely on the withdrawal of the idle wheel to take place gravitationally and therefore spring means may be provided to effect such withdrawal.

What I claim and desire to secure by Letters Patent is:

1. Coupling for the transmission of rotary motion comprising a driving, an idle and a driven wheel constituting a train of three friction wheels, lever means, on which the idle wheel is mounted, supported for pivotal motion about the axis of the driving wheel for enabling the idle wheel to be engaged in driving connection with the driving and the driven wheel by the torque of the driving wheel and withdrawn from such driving connection upon cessation of that torque and means for allowing a limited amount of relative independent motion of the idle wheel transversely to its axis with relation to the driving wheel substantially in the plane connecting the axes of the driving wheel and the idle wheel, said lever means including a lever one end of which has said idle wheel mounted thereon and the other end of which is supported for pivotal motion as aforesaid and an arm co-pivoted with the latter end of said lever and on the other end of which said driving wheel is mounted.

2. Coupling according to claim 1, in which friction clutch means, set to permit slip, is disposed between the idle wheel and the lever.

3. Coupling according to claim 1, in which an arm, on which the said idle wheel is mounted, is pivotally secured to the lever for pivotal motion about an axis parallel to the axis of the idle wheel and in which friction clutch means, set to permit slip, is disposed between the lever and an assembly comprising the driving wheel and a shaft to which the driving wheel is secured, resilient means being provided between the arm and the lever for urging the idle wheel into working contact with the driving wheel.

4. Coupling according to claim 1, in which an arm, on which the said idle wheel is mounted, is pivotally secured to the lever for pivotal motion about an axis parallel to the axis of the driving wheel, resilient means being provided between the arm and the lever for urging the idle wheel into working contact with the driving wheel.

5. Coupling according to claim 1, in which an arm, on which the said idle wheel is mounted, is pivotally secured to the lever for pivotal motion about an axis parallel to the axis of the idle wheel, in which resilient means is provided between the arm and the lever for urging the idle wheel into working contact with the driving wheel and in which friction clutch means, set to permit slip, is disposed between the idle wheel and the arm.

6. Coupling according to claim 1, in which an axle, on which the idle wheel is mounted, is supported in slots in the lever for free sliding motion therein, said slots extending substantially in the direction of a plane connecting the axes of the driving and the idle wheel, and friction clutch means, set to permit slip, disposed between the lever and an assembly comprising the driving wheel and a shaft to which the driving wheel is secured.

7. Coupling for the transmission of rotary motion comprising a first friction wheel, a shaft on which the same is mounted for rotation therewith, a lever pivotally supported relative to the center of the shaft, an arm pivotally supported on the free end of the lever and about an axis parallel to the shaft, a second friction wheel, an axle, on which the same is mounted, parallel to said shaft and secured to the free end of the arm, friction clutch means between the shaft and first friction wheel assembly on the one hand and the lever on the other hand, said friction clutch means being set to permit slip, a spring acting on the arm to press the second friction wheel into rotation transmitting contact with the first friction wheel, and stop means for limiting the amount of pivotal motion of the lever relative to a stationary member.

References Cited in the file of this patent

UNITED STATES PATENTS

| 1,175,342 | Conrad | Mar. 14, 1916 |
| 1,502,671 | Hillmer | July 19, 1924 |
| 1,633,863 | Kelley et al. | June 28, 1927 |

FOREIGN PATENTS

| 106,008 | Switzerland | Aug. 1, 1924 |
| 148,514 | Great Britain | July 10, 1920 |
| 736,732 | France | Sept. 26, 1932 |